United States Patent [19]
Story et al.

[11] Patent Number: 6,141,670
[45] Date of Patent: *Oct. 31, 2000

[54] APPARATUS AND METHOD USEFUL FOR EVALUATING PERIODIC FUNCTIONS

[75] Inventors: Shane A. Story, Beaverton, Oreg.; Ping Tak Peter Tang, Richmond, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/941,359

[22] Filed: Sep. 30, 1997

[51] Int. Cl.$^7$ .................................. G06F 1/02; G06F 7/38
[52] U.S. Cl. .......................... 708/276; 708/495; 708/510
[58] Field of Search .................... 364/718.01, 748.01, 364/748.16, 721; 708/270, 276, 495, 510

[56] References Cited

U.S. PATENT DOCUMENTS

| | | | |
|---|---|---|---|
| 5,068,816 | 11/1991 | Noetzel | 364/718.01 |
| 5,452,241 | 9/1995 | Desrosiers et al. | 364/748.01 |
| 5,463,574 | 10/1995 | Desrosiers et al. | 364/748.01 |

OTHER PUBLICATIONS

J. M. Muller, "Elementary Functions: Algorithms & Implementation" (1997 Birkhauser), Chapter 8, pp. 143–148, 154–162.

Roger Alan Smith, "A Continued–Fraction Analysis of Trigonometric Argument Reduction", IEEE Transactions on Computers, Nov. 11, 1995, vol. 44 No. 11.

Ping Tak Peter Tang, Table–Driven Implementation of the Logarithm Function in IEEE Floating–Point Arithmetic, ACM Transactions on Mathematical Software, Dec. 1990, vol. 16, No. 4, pp. 378–400.

*Primary Examiner*—Tan V. Mai
*Attorney, Agent, or Firm*—Blakely, Sokoloff, Taylor & Zafman LLP

[57] ABSTRACT

A computer and a method of using the computer to reduce an original argument to obtain a periodic function of the argument. A special number $P_j$ is employed that is close to a nontrivial even-integral multiple π. The technique subtracts a non-negative integral multiple of $P_j$ from the original argument to obtain a first reduced argument. Then, a second non-negative integer multiple of a floating-point representation of π/2 is subtracted from the first reduced argument to obtain a second reduced argument. Next, a periodic function of a third argument equal to a sum of the second reduced argument plus the product of the first non-negative integral multiple and a floating-point representation of an offset $δ_j$ is evaluated to obtain a result.

28 Claims, 4 Drawing Sheets

APPARATUS AND METHOD USEFUL FOR EVALUATING PERIODIC FUNCTIONS

BACKGROUND OF THE INVENTION

1. Field of the Invention

The present invention relates generally to calculators, computers, and arithmetical errors, and, more particularly, to an apparatus and method useful for reducing the floating-point error associated with evaluating periodic functions.

2. Description of Related Art

A mathematical operation performed in a computer or similar hardware platform carries with it certain imprecisions. These imprecisions arise from characteristics of the hardware which is used to represent real numbers in a computer. Due to the finite size of memory storage locations, e.g. hardware characteristics, computers approximate non-terminating, real numbers by either truncating or rounding to a computer number having a preselected number of significant digits. These computer numbers are commonly referred to as floating-point numbers. Once the real numbers are represented as floating-point numbers, further imprecisions arise, because arithmetic operations performed by a computer generally involve further truncation or rounding.

As a simple illustration, consider a computer that only stores numbers having two decimal digits in the registers of an arithmetic logic unit (ALU). Such a computer may store the two real numbers 1.2 and 3.4 exactly. Nevertheless, the computer truncates or rounds the number representing the product of these two numbers, e.g., 1.2×3.4=4.08, because the registers of the ALU may only store numbers having two digits, and the product has three significant digits. For many arithmetic operations, the computer truncates or rounds. Reducing truncation and rounding errors arising from arithmetic operations is desirable in a computer or similar hardware computing platform.

Now, suppose that one wants to evaluate a periodic function at a particular floating-point value, x, in a computer that can represent floating-point numbers having mantissas with b or less significant digits. For very small values of x, the evaluation of the periodic function is typically straightforward using a power series expansion. For example, the absolutely convergent series:

$$\sin(x)=x-x^3/3!+x^5/5!+\ldots$$

$$\cos(x)=1-x^2/2!+x^4/4!+\ldots$$

give values for the sine and cosine functions that can be accurately computed with a relatively small number of terms in a truncated power series when x is small. In evaluating the truncated power series, the absolute error is governed by the magnitude of the first truncated term of the convergent power series. When the value of x is small, a value for the periodic function, with a small relative error, is straightforward to obtain, because the truncation is understood and rounding errors can be controlled by careful computations which use multiple machine precision, if necessary.

As the value of x increases, the problem of evaluating simple functions with their power series expansions often becomes more pronounced. In many cases, the use of a power series expansion becomes impractical, because rounding error contaminates the results or multiple machine precision computations become unmanageable.

For periodic functions, the large input arguments can be reduced, in magnitude, to smaller reduced arguments that allow more manageable evaluations of the functions with truncated series. The smaller reduced arguments are obtained from identities for periodic functions. In general, a periodic function $f(x)$ satisfies the relation:

$$f(x)=f(x+Np),$$

where p is the period, and N is any integer. For the case of the sine and cosine functions two specific relations are:

$$\sin(x)=\sin(x+2\pi N) \text{ and } \cos(x)=\sin(x+\pi/2).$$

In the evaluation of periodic functions on a computer having a fixed machine precision, a fundamental problem is the performance of argument reductions when the argument x is large, and the period p is a non-rational real number. In the case of the sine and cosine functions, the period $2\pi$ is such a non-rational real number. If the period p is not rational, the argument reduction is, in itself, approximate when performed in a computer.

In computer argument reductions, the goal is to compute a reduced argument y to the machine's precision from an initial argument x. The reduced argument y satisfies the relation:

$$y=x-Np$$

For the trigonometric functions, the reduced argument y satisfies:

$$y=x-2\pi N.$$

By using the above-mentioned relations between the sine and the cosine, one can also do argument reductions of trigonometric functions by subtracting integer multiples of $\pi/2$. Then, a reduced argument y satisfies $y \in [-\pi/4, +\pi/4]$ and is defined by:

$$y=x-\pi N/2.$$

For this definition of y, cos (x) is given by:

cos (y) if N mod 4=0,

−sin (y) if N mod 4=1,

−cos (y) if N mod 4=2, or

+sin (y) if N mod 4=3.

For the same definition of y, sin (x) is given by functions of the above list, wherein N is replaced by N+1. In a computer, only an approximation to $\pi/2$ may be represented. As the magnitude of x increases, more and more digits of $\pi/2$ will be involved in the computation of $y=x-\pi N/2$ to machine precision. Prior art shortcuts to using higher precision values of $\pi$ for the reduction of larger arguments x often did not result in an accurate reduced argument.

One prior art method for argument reductions is due to Cody and Waite. The method is described below, but more details may be found a book by Jean-Michel Muller, *Elementary Functions Algorithms and Implementation,* 148 (1997). This method comprises finding two numbers $C_1$ and $C_2$ that are exactly representable in the computer being used. $C_1$ is very close to the period, p, and is frequently the first few digits of p. For values of N that are not too large, N $C_1$ is exactly representable in the computer even though the period, e.g., $p=C_1+C_2$, is beyond working precision. Then instead of evaluating x−Np, the method evaluates $(x-NC_1)-NC_2$. If $NC_1$ is exactly representable, the term in parentheses may be evaluated without any error. Then, the result will be obtained to a larger precision than a direct argument reduction would obtain. A second prior art method due to Payne and Hanek is described in the above-mentioned book. Id. at 154.

Another technique effectively uses floating-point numbers to multiple machine precision. The technique writes π as a sum of several pieces as follows:

$$\pi = PI_1 + PI_2 + PI_3 + PI_4 \ldots$$

In a computer with 64 digit registers, the pieces $PI_1$, $PI_2$, $PI_3$, each contain 64 binary digits of the binary expression for π. $PI_1$, $PI_2$, $PI_3$, etc. have exponents $2^1$, $2^{-63}$, $2^{-127}$ etc. and mantissas between 1 and 2. The truncation to four terms provides an approximation for π to 256 bits. A programmer of ordinary skill could compute, the appropriate integer N, e.g., the nearest integer to x, by evaluating individual terms in:

$$y = x - ((N \times PI_1)/2 + (N \times PI_2)/2 + (N \times PI_3)/2 + (N \times PI_4)/2)$$

and adding the results. The reduced argument y may be obtained in a similar way. This technique for performing argument reductions is costly in terms of computer time. A method that can perform argument reductions with fewer bits of π, i.e., fewer multiple machine precision calculations, would use costly computer time more efficiently.

FIG. 1 is a flow chart of another prior-art method for evaluating cos (x) in a computer having 80-binary bit memory storage locations. The computer allocates 64-bits of a memory location to a floating-point number's mantissa, 15-bits to the number's exponent, and 1-bit to the number's sign. The method assumes that the original argument x may be represented exactly by a 64-digit mantissa, e.g., a hardware related restriction on the program of FIG. 1, and also that $|x| < 2^{63}$. The precisions of the blocks of FIG. 1 determine whether the result is accurate to machine precision.

Referring to FIG. 1, at block 10 the computer initializes values of variables of the program. At block 12, the computer determines N, the integer part of 2x/π. At block 14, the computer subtracts Nπ/2 from the argument x to obtain a reduced argument y in the range of [−π/4, +π/4]. At block 16, the computer determines the number of terms of the series expansion of cos (y) (or sin (y) if appropriate) that will give a result to 64-bit, machine precision. At block 18, the computer evaluates the truncated series for cos (y) (or sin (y) if appropriate) in an accurate manner. At block 20, the computer uses the above-mentioned relation between cos (x) and cos (y) (or sin (y) if appropriate) to determine cos (x).

Generally, the relative error of cos (y) or sin (y) is within machine precision, for a machine using mantissas having P binary digits, if the error in the reduced argument y satisfies $error_y < 2^{-(P+3)}|y|$. Here, $error_d = |d - d_{computer}|$, i.e. the absolute error of d. The $error_y$ is ordinarily determined by the number of PI's that are employed in the argument reduction of block 12. For the reduced argument to be accurate to a relative error of less than $2^{-67}$, more PI's are used. If the magnitude of the original argument x is close to $2^{63}$, the computer uses π and performs argument reductions to quadruple machine precision through hardware or software implementations. These multiple machine precision methods may be very time intensive and thus, undesirable in high speed computers.

These results clarify some problems with prior art methods for argument reduction. For example, the PENTIUM™ PRO processor of INTEL Corporation simply uses a 66-bit value of π to do argument reductions for original arguments up to $2^{63}$ in magnitude. The use of a 66-bit value of π is probably not sufficient to accurately evaluate a trigonometric function with a generic argument of this magnitude.

The present invention is directed to overcoming, or at least reducing the effects of, one or more of the problems set forth above.

SUMMARY OF THE INVENTION

The various embodiments of the invention comprise a program storage device readable by a computer, tangibly encoding a program; a computer having the program; and a method. The program has instructions executable by the computer for performing the steps of the method. The method evaluates a first periodic function at an original argument. The steps include subtracting from the original argument a first non-negative integer multiple of a first special number $P_j$ to obtain a first reduced argument. A register of an arithmetic logic unit of the computer is capable of storing the first special number $P_j$. The steps include subtracting from the first reduced argument a second non-negative integer multiple of a floating-point representation of π/2 to obtain a second reduced argument. The steps include evaluating a second periodic function at a third argument equal to a sum of the second reduced argument plus a product of the first non-negative integer multiple times a floating-point representation of a second number $\delta_j$. The steps include presenting a value of the second periodic function as the value of the first periodic function at the original argument.

BRIEF DESCRIPTION OF THE DRAWINGS

The following and other advantages of the invention will become apparent upon reading the following detailed description and upon reference to the drawings in which.

Figure 1:
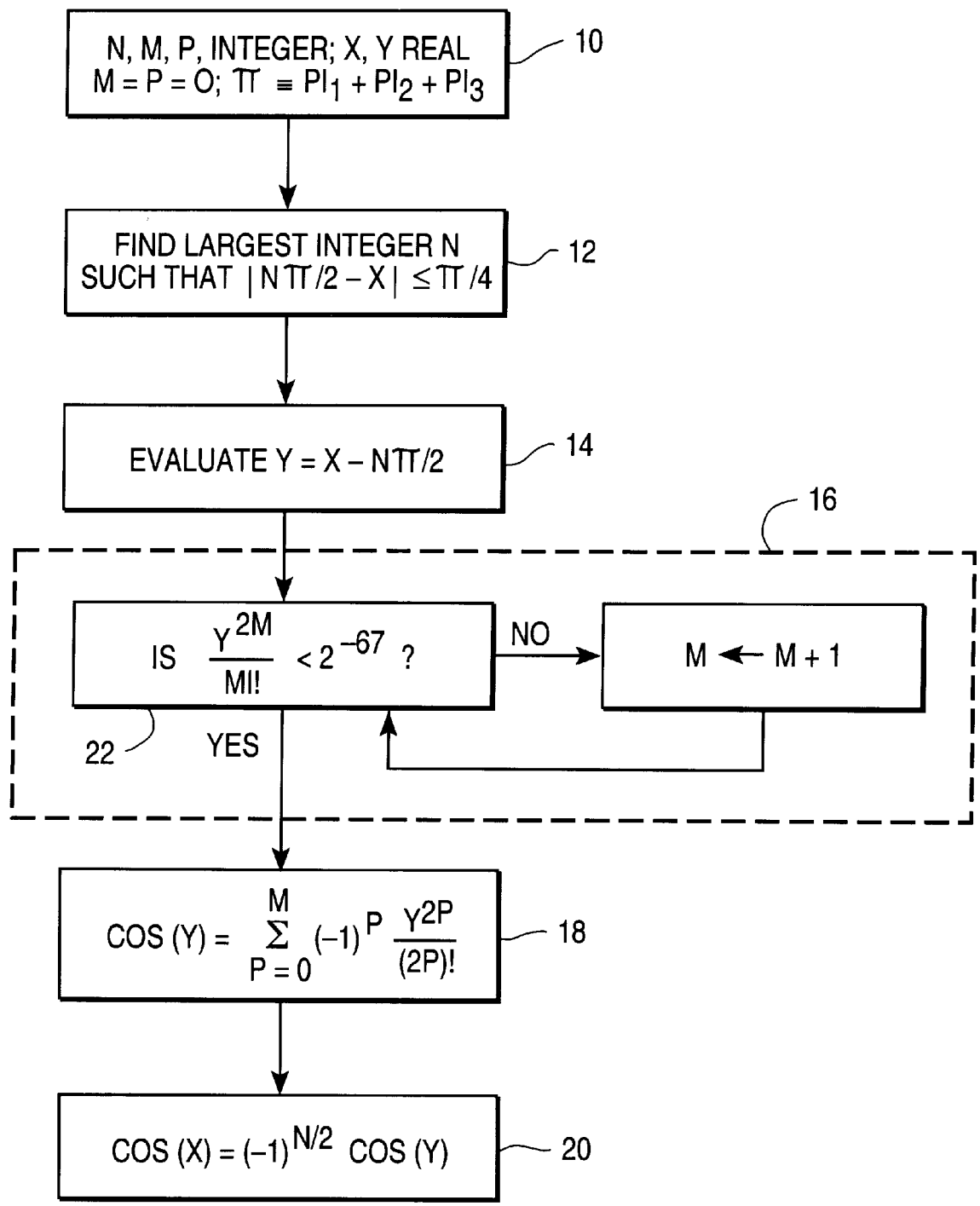
FIG. 1 is a flow chart of steps of a prior art method to evaluate cos (x) for large arguments x.

While the invention is susceptible to various modifications and alternate forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

The following examples are included to demonstrate illustrative embodiments of the invention. It should be appreciated by those of skill in the art that the techniques disclosed in the examples which follow represent techniques discovered by the inventor to function well in the practice of the invention, and thus may be considered to constitute illustrative modes for its practice. However, those of skill in the art should, in light of the present disclosure, appreciate that many changes may be made in the specific embodiments which are disclosed and still obtain a like or similar result without departing from the spirit and scope of the invention.

The illustrative embodiments comprise a computer or similar hardware platform having a program comprising instructions for a method, a program storage device readable by the computer encoding the program in a form executable by the computer, the method executed on the computer or similar hardware platform, and a firmware device for executing the method. The invention is not, however, limited to these embodiments. The program storage devices include: magnetic disks, optical compact disks, hard drives, magnetic tapes, read only memory (ROM), random access memory and other computer readable storage devices having similar form and function. The firmware device implements a method in accordance with the invention. The construction of a firmware device to implement the method otherwise capable of being carried out by a computer or similar hardware platform is known to persons of ordinary skill in the art.

Figure 2:
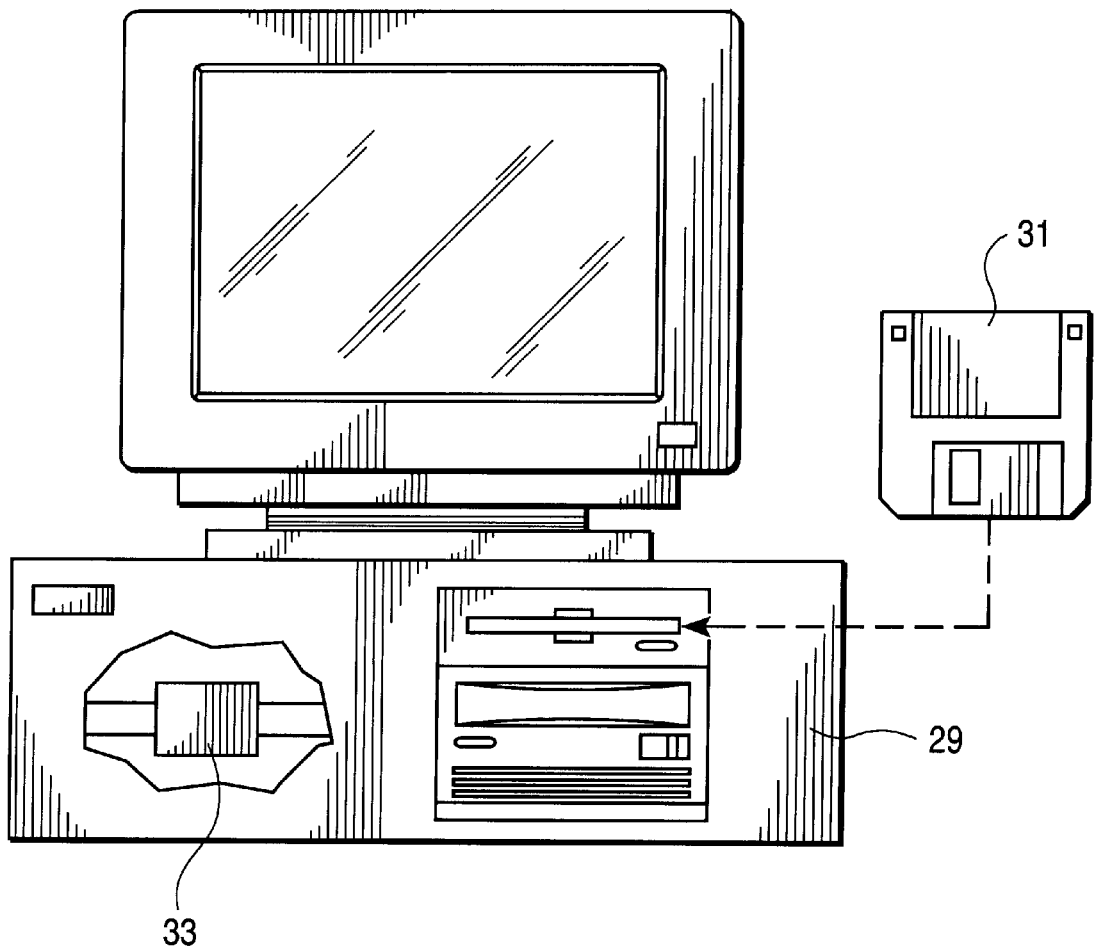
FIG. 2 is an illustrative embodiment of a computer having a program.

FIG. 2 illustrates a specific embodiment for a computer 29 and program storage device 31 encoding a program in a form executable by the computer 29. The program is sometimes written in ROM or firmware 33 to be more efficiently executable. The hardware of these embodiments employ registers that may store floating-point numbers having 64 binary digit mantissas. Other embodiments may employ hardware that may store floating-point numbers having mantissas of different length.

Figure 3:
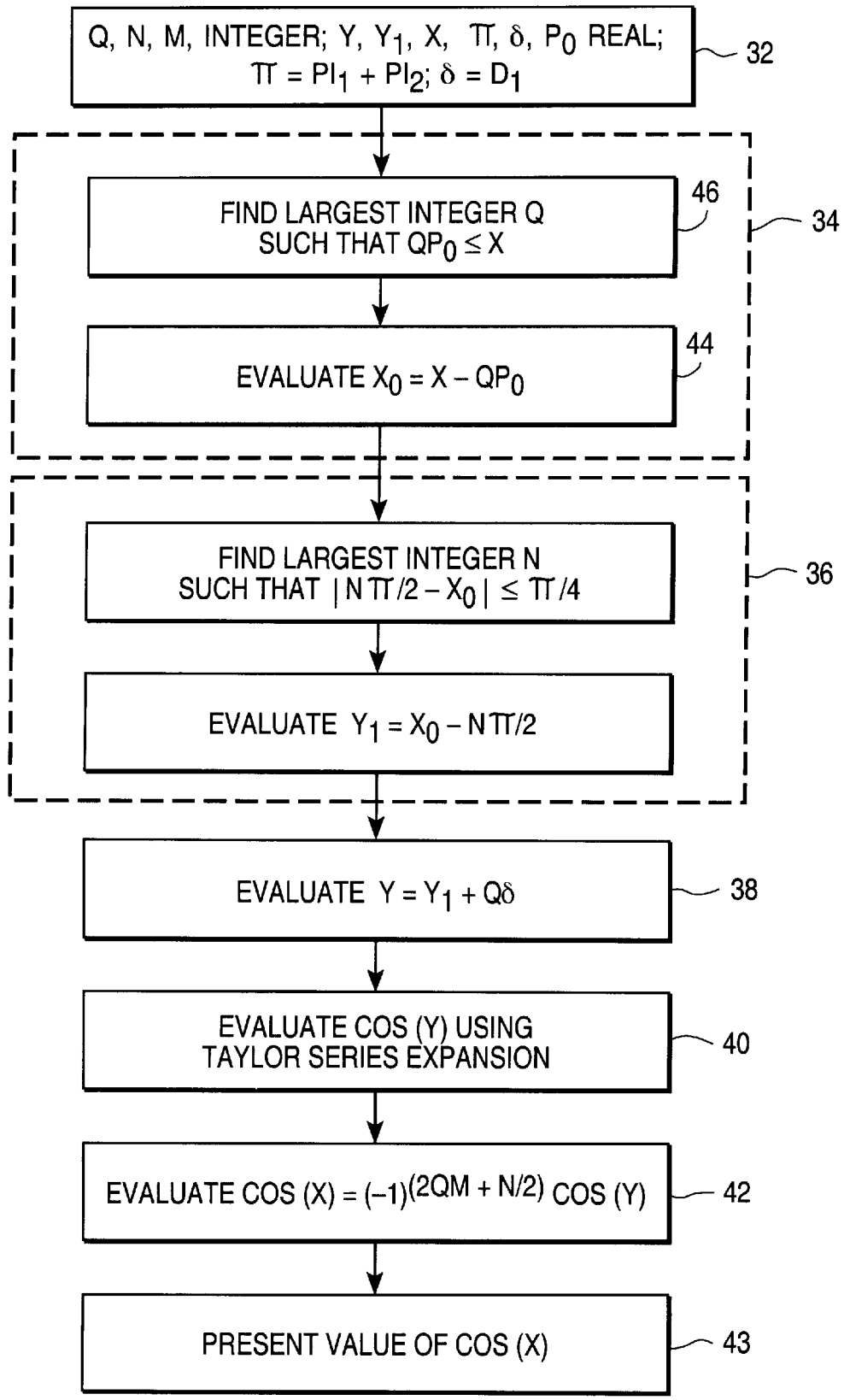
FIG. 3 is a flow chart of steps of a method that the embodiment in FIG. 3 may use to evaluate cos (x) when the argument x is large in magnitude.

When programmed to perform the steps illustrated in FIG. 3, the computer or similar hardware platform 29 evaluates cos (x) for $|x|<2^{63}$ by a method in accordance with the invention. Other embodiments may evaluate other trigonometric functions such as sin (x) and tan(x). At block 32, the method initializes variables and numbers. At block 34, the method uses a special number $P_0$ to reduce arguments greater than $P_0$ to a first reduced argument $x_0$. Here, $P_0 2\pi M+\delta$ with M being a known integer and $\delta<2^{-63}$. The difference between $P_0$ and $2\pi M$, e.g., $\delta$, is shifted off by 23 binary digits. Shifted off by 23 binary digits, in this context, means that the least significant digit of $P_0$ is $2^{23}$ greater than the most significant digit of $\delta$. At blocks 36, 38, the method reduces the first reduced argument $x_0$ with respect to $\pi/2$. The second reduced argument y, satisfies $|y| \leq \pi/4$. At block 40, the method uses the second reduced argument y to evaluate cos (y) (or sin (y) when appropriate as explained below) by well-known, series techniques. At block 42, the method evaluates a trigonometric identity to determine cos (x). At block 43, the method presents a value of cos (x). The word "presenting" is defined to mean writing the value of a floating-point number to a memory address or device or displaying the value on a screen.

In the following, the word precision is defined to mean the number of binary digits to which a floating-point number is evaluated, the number of digits being ordinarily measured in multiple's of the machine's precision. Specific embodiments may employ hardware or combined hardware and software methods to perform floating-point evaluations to multiple machine precision. Multiple precision evaluations may utilize special machine instructions for "fused multiply and add", e.g., operations that evaluate A×B−C before storing to a register of machine size, or other techniques.

The special number $P_0 \in [2^{23}, 2^{24})$ is adapted to the hardware of the computer 29 of the specific embodiment of FIG. 2. In particular, the arithmetic logic units (ALU) of the computer 29 manipulate floating-point numbers having 64 bit mantissas. Therefore, the specific embodiment of FIG. 2 employs the particular method based on the special number $P_0$ having a 64-bit mantissa. The computer 29 or similar hardware platform may store $P_0$ exactly in the registers of the ALU's of the computer 29. In this sense, the program implementing the method based on $P_0$ is specially adapted to the hardware of the computer 29 of FIG. 2. The size of the shift off of $\delta$ may also be related to hardware features of the computer 29 of the embodiment. ALU's having registers for shorter mantissas would use other special numbers to implement the method of FIG. 3.

Figure 4:
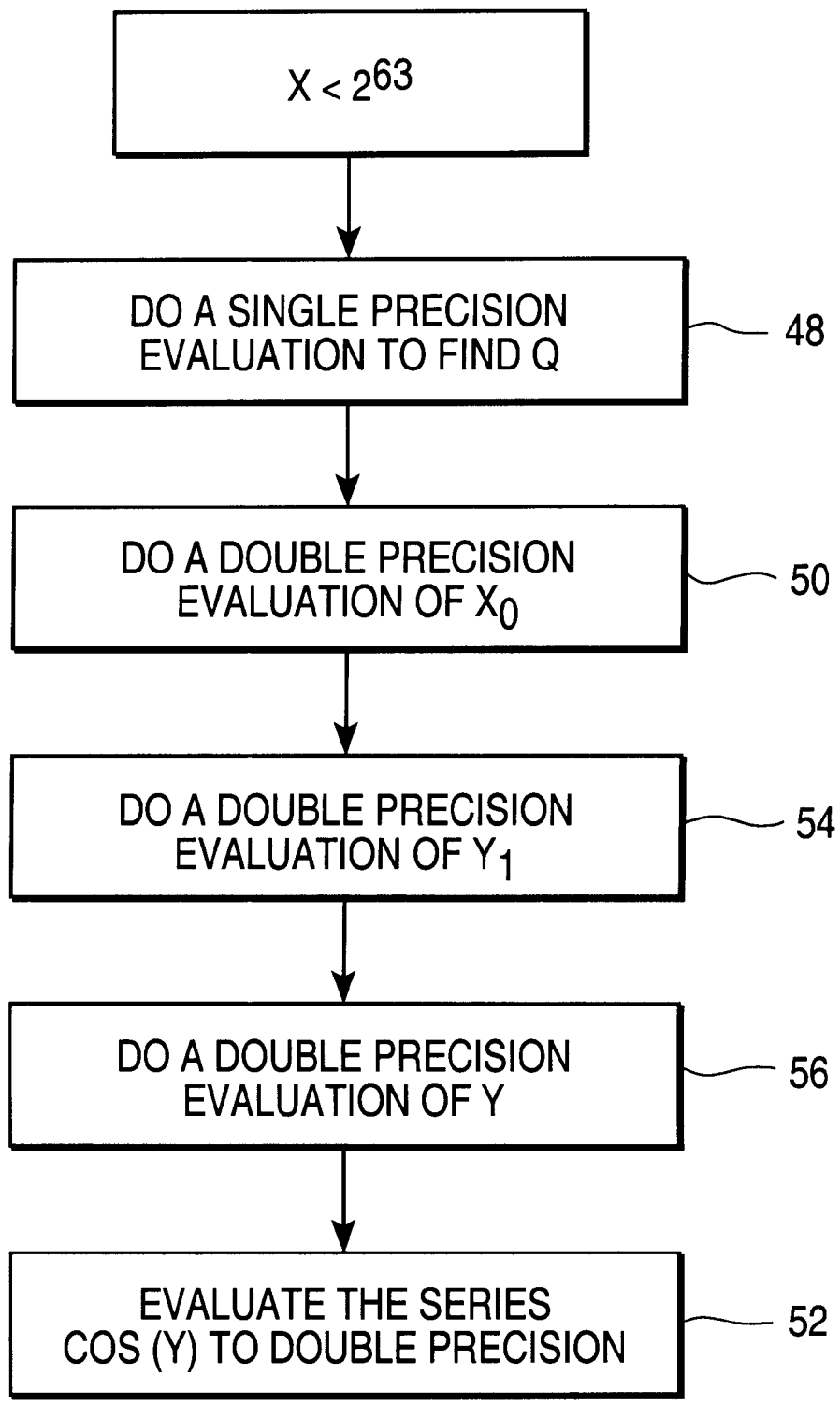
FIG. 4 is a schematic diagram showing the precisions of the steps of the method of the embodiment of FIG. 3.

To construct the specific embodiment, the precision of the steps of FIG. 3 are preferably found. At block 44, the first reduced argument, $x_0$, satisfies $x_0=x-QP_0$ where Q is the closest integer 46 to $x/P_0$. Since $|x|<2^{63}$ and $P_0 \geq 2^{23}$, Q is an integer satisfying $Q<2^{40}$. Thus, as illustrated in FIG. 4 a single machine precision evaluation of Q, at block 46, is exact. The evaluation of Q is preferably performed to single precision, as noted at block 48 of FIG. 4. Since $P_0$, Q and x have no more than 64, 40, and 64 significant bits respectively, the evaluation of $x_0$, at block 44, is precise when done to double machine precision as noted in block 50 of FIG. 4. The evaluation of cos (y) and sin (y), for $y \in [-\pi/4, +\pi/4]$, generally have machine precision, e.g., $\text{error}_{\cos (y)}$, $<2^{-64}|\cos (y)|$ and $\text{error}_{\sin (y)}<2^{-64}|\sin (y)|$, if $\text{error}_y<2^{-67}|y|$. Thus, a double machine precision evaluation 52 of the series 40 for cos (y) or sin (y), as appropriate, ensures that the result has, at least, machine precision for the specific embodiment of FIGS. 3–4. The evaluation of the trigonometric identity at block 42 and the presentation of the evaluation at block 43 ordinarily are sufficiently accurate when performed to machine precision.

Referring to FIG. 3, the second reduced argument 34 satisfies $y_1=x_0-N\pi/2$ with $y_1 \in [-\pi/4, +\pi/4]$ at block 34. Since Q is the closest integer to $x/P_0$, $x_0<P_0<2^{24}$. Since $|x_0|<2^{24}$, the integer N satisfies $N<2^{24}$. The value of N is small compared to x thereby making the reduction of $x_0$ at block 36 easier than the direct prior art reduction of x as illustrated at block 14 of FIG. 1. The precision of the second argument reduction at blocks 36, 38 comes from the relation that $\text{error}_y<2^{-67}|y|$.

The exact reduced argument y satisfies the equation $y=x-K\pi/2$ for some integer K. Substituting the exact equation $x=x_0+QP_0$ from block 44 into the equation for $y_1$, at block 36, one obtains that:

$$y_1=x_0-N\pi/2=x-QP_0-N\pi/2.$$

Substituting the relation $P_0=2M\pi+\delta$, one finds that:

$$y_1=x-N\pi/2-Q(2M\pi+\delta).$$

The above equation and the above-definition of y determine the final reduced argument y and the integer K:

$$y=y_1+Q\delta \text{ and } K=N+4QM.$$

The specific embodiment of FIGS. 2–4 may make two errors with respect to the exact reduction. First, $\pi$ is replaced by floating-point numbers in the evaluation of $y_1$ at block 36. Second, the specific embodiment replaces the real number $\delta$ by its floating-point representation in evaluating the second reduced argument y at block 38. The precision of y is determined by the precision of $\pi$ and $\delta$ employed in blocks 36, 38. To put limits on error, and errors one subtracts the computer values from exact values.

$\text{error}_\delta$ and $\text{error}_\pi$ represent the rounding or truncation error incurred by using floating-point numbers for real numbers $\pi$ and $\delta$. On the computer 29 of FIG. 2, $\pi$ and $\delta$ are given by sums of 64 bit numbers, i.e., $\pi=PI_1+PI_2+PI_3+\ldots$ and $\delta=D_1+D_2+\ldots$. Here, $D_1$, $D_2$, $D_3$ and $PI_1$, $PI_2$, $PI_3$ each have 64 bits of precision of $\delta$ and $\pi$ respectively. In 80-bit format, these numbers are:

PI$_1$ = 4000 C90F DAA2 2168 C235,
PI$_2$ = BFBE ECE6 75D1 FC8F 8CBB,
PI$_3$ = BF7D B7ED 8FBB ACC1 9C60,
D$_1$ = BFC0 8D84 8E89 DBD1 71A1,
D$_2$ = BF7D D539 4C36 18A6 6F8E,
P$_0$ = 4017 C84D 32B0 CE81 B9F1.

The 80-bit format employed represents all numbers with hexadecimal digits. The first four digits are made up of a binary digit for the sign and a binary exponent, offset by 3FFF. The last sixteen digits are the mantissa of the number. The mantissas belong to the interval [0,2). As is discussed below and above, other embodiments may use other special numbers instead of P$_0$. Those special numbers should be specifically adapted to the register size of the computer or similar hardware platform of the particular embodiment.

By using a triple machine precision floating-number for $\pi$ and double machine precision floating-number for $\delta$, the specific embodiment of FIGS. 2–4 obtains a relative precision for y of $2^{-67}$. In alternate embodiments employing a computer that manipulates floating-point numbers having P binary digit mantissas, the relative precision for y is preferably at least $2^{-(P+3)}$. This is to be contrasted with the prior-art method of FIG. 1 which generally employed hardware or software that involving a floating-point representation of $\pi$ and argument reductions to quadruple machine precision. The reduction in the precisions employed in the embodiment's argument reductions ordinarily decreases the machine time needed.

Embodiments of the present invention are not limited to computers using 64-bit mantissas or to original arguments $|x|<2^{63}$. These particular values of parameters were used to illustrate one embodiment and to describe the analysis underlying the precision of one specific embodiment and are not essential to the practice of the present invention except as otherwise provided above based on this specification. For other embodiments, the special number replacing P$_0$ should be chosen so that the special number may be stored exactly in registers of the embodiment's ALU. It would be routine for a person of ordinary skill in the art to change these parameters and construct and use embodiments employing different size mantissas.

Though the constant P$_0$ is a special number, there are other special numbers P$_j$ which may replace P$_0$. For a computer using floating-point numbers with exponents having R digits and mantissas having S digits, the other special numbers P$_j$ satisfy $P_j=2L_j\pi-\delta_j$ where $L_j$ is a positive integer greater than 1 and $\delta_j$ is a number shifted off by several zeros with respect to P$_j$. The P$_j$ should be specially adapted to the hardware of an embodiment. The P$_j$ should have a mantissa that is not longer than the maximum length for mantissas that may be stored in registers of ALU's of the embodiment. The exact shift off of $\delta_j$ is not essential, but a greater shift off generally increases the utility of a particular P$_j$ in an embodiment. For example, the shift off of the $\delta$ of the illustrative embodiments employing P$_0$ was 23 zeros. This shift off enabled argument reductions for $|x|<2^{63}$ without the need for quadruple machine precision evaluations and the heavy cost in machine time that such evaluations imply. After determining the shift off desired and the mantissa length S, an ordinary worker in the art may enumerate the various P$_j$ without undue experimentation.

At least one method for determining efficient P$_j$'s may employ computer execution. The method is described below, however more details are found in the article of Roger Alan Smith, *A Continued-Fraction Analysis of Trigonometric Argument Reduction*, 44 IEEE Transactions on Computers, 1348–51 (1995), which is incorporated herein by reference in its entirety. The P$_j$'s will be efficient in the sense that they have shift off in an interval $[2^e, 2^{e+1})$. The first step is to define two positive integers e and $\xi$, wherein $2^e \leq P_j < 2^{e+1}$ and a constraint on $\xi$ will be discussed below. Then, determine a positive integer M(e) defined by the 0's and 1's of the binary representation of $4/\pi$ starting at $2^{S+1-e}$ and ending at $2^{-S-1-e-\xi}$. Then, find a sequence of convergents $r_h x_h^{-1}$, with index h, for the continued fraction decomposition of the fraction $M(e)2^{-2S-\xi-1}$, wherein the $r_h$ and $x_h$ do not have more than S binary digits. Then, find the integer k of the sequence of convergents for which $x_k<2^S \leq x_{k+1}$. Then, P$_j$ and $\delta_j$ are given by:

$P_j = x_k 2^{e-S+3}$ and $\delta_j = [\pi][M(e)x_k 2^{-2S-\xi} - 2r_k]$.

The solution for $\delta_j$ is approximate with error$_\delta<2^{-S-\xi}$. Thus, the method only gives a consistent solution if $|\delta_j|>2^{-S-\xi}$. For each potential solution P$_j$ and $\delta_j$, this inequality must be verified or corrections will change the shift off of $\delta_j$. It is generally possible to minimize error$_\delta$ by making $\xi$ a larger positive integer. Thus, $\xi$ is adjusted to obtain better approximations for $\delta_j$. The scope of the present invention is deemed to include embodiments employing other P$_j$'s and $\delta_j$'s that may be obtained through the above-mentioned and similar methods. The determination of other P$_j$'s and $\delta_j$'s is routine for an ordinary worker in the art in light of this specification.

The use of a two step argument reduction is not essential to the present invention. An embodiment may employ a plurality of steps involving a plurality of pairs P$_j$, $\delta_j$. In a first step, the original argument of the first trigonometric function is reduced to a first reduced argument by using the first pair P$_j$, $\delta_j$. The first step proceeds as disclosed above, and the first reduced argument is less that the first P$_j$. In a second step, the first trigonometric function at the first reduced argument is evaluated by an embodiment disclosed above using a second pair P$_{j'}$, $\delta_{j'}$. It would be routine for a person of ordinary skill in the art to modify the present embodiments to obtain alternate embodiments employing more than one special number P$_j$, $\delta_j$ pair and more than one intermediate argument reduction, for example.

All of the methods and apparatus disclosed and claimed herein may be made and executed without undue experimentation in light of this specification. While the apparatus and methods of this invention have been described in terms of illustrative embodiments, it will be apparent to those of skill in the art that variations may be applied to the methods and apparatus herein without departing from the concept, spirit and scope of the invention. All such similar variations and modifications apparent to those skilled in the art are deemed to be within the spirit, scope and concept of the invention as defined by the appended claims.

What is claimed is:

1. A machine-readable medium having stored thereon a set of instructions for execution on a computer, said instructions when executed by the computer perform a method for evaluating a first periodic function utilizing a special number comprising:

providing argument reduction of an original argument such that a floating-point representation of $\pi/2$ having a reduced number of bits is stored within said computer comprising:

selecting a special number $P_j$ based upon a bit length of a register of said computer;

subtracting from said original argument a first non-negative integer multiple of said special number $P_j$ to obtain a first reduced argument; and subtracting from said first reduced argument a second non-negative integer multiple of said floating-point representation of π/2 to obtain a second reduced argument;

evaluating a second periodic function at a third argument equal to a sum of said second reduced argument plus a product of said first non-negative integer multiple and a floating-point representation of a second number $\delta_j$, said second number $\delta_j$ being shifted off a selected number of bit positions from said special number $P_j$; and outputting a value of said first periodic function evaluated at said original argument utilizing said second periodic function evaluated at said third argument.

2. The machine-readable medium of claim 1, wherein said first reduced argument is less than the special number $P_j$ in magnitude.

3. The machine-readable medium of claim 2, wherein said second reduced argument is not greater than a second floating-point representation of π/4 in magnitude.

4. The machine-readable medium of claim 3, wherein the floating-point representations of π/2 and said $\delta_j$ are double and single precision numbers respectively.

5. The machine-readable medium of claim 3, wherein said first periodic function is a sine or a cosine function, and said first periodic function is $-1^K$ multiple of said second periodic function, said integer K being a sum of said second non-negative integer multiple plus a product of said first non-negative integer multiple and M, and wherein said integer M is defined by the equation $P_j=2\pi M+\delta_j$.

6. The machine-readable medium of claim 3, wherein said instructions operate on floating-point numbers having 64 bit mantissas and the special number $P_j$ has a mantissa of not more than 64 bits.

7. The machine-readable medium of claim 3, wherein the special number $P_j$ is equal to a special number $P_0$ and said $\delta_j$ is equal to $\delta_0$.

8. An apparatus for providing argument reduction utilizing a special number to compute a first periodic function of an original argument comprising:

a storage device to store a special number $P_j$;

a processor coupled to receive said special number $P_j$ and to provide argument reduction of said original argument such that a floating-point representation of π/2 having a reduced number of bits is stored within said storage device wherein said special number $P_j$ is dependent upon a bit length of a register within an arithmetic logic unit of said processor;

said processor subtracting from said original argument a first non-negative integer multiple of said special number $P_j$ to obtain a first reduced argument;

said processor subtracting from said first reduced argument a second non-negative integer multiple of said floating-point representation of π/2 to obtain a second reduced argument;

said processor evaluating a second periodic function at a third argument equal to a sum of said second reduced argument plus a product of said first non-negative integer multiple and a floating-point representation of a second number $\delta_j$, said second number $\delta_j$ being shifted off a selected number of bit positions from said special number $P_j$; and said processor generating a value as an output utilizing said second periodic function evaluated at said third argument, wherein said output is a computed result to determine the value of said first periodic function of said original argument.

9. The apparatus of claim 9, wherein said processor processes said first reduced argument to be less than the special number $P_j$ in magnitude.

10. The apparatus of claim 10, wherein said processor processes said second reduced argument to be not greater than a second floating-point representation of π/4 in magnitude.

11. The apparatus of claim 11, wherein said processor will generate an error result when said original argument is greater than or equal to $2^{63}$.

12. The apparatus of claim 11, wherein said processor processes the floating-point representations of π/2 and $\delta_j$ in double and single precision number formats, respectively.

13. The apparatus of claim 11, wherein said processor processes said first periodic function which is a sine or cosine function, and said first periodic function is $-1^K$ multiple of said second periodic function, said integer K being a sum of said second non-negative integer multiple plus a product of said first non-negative integer multiple and M, and wherein said integer M is defined by the equation $P_j=2\pi M+\delta_j$.

14. The apparatus of claim 9, wherein said arithmetic logic unit processes floating-point numbers having 64 bit mantissas and said special number $P_j$ has a mantissa of not more than 64 bits.

15. The apparatus of claim 9, wherein the storage device stores said special number $P_j$ as a special number $P_0$ and said second number $\delta_j$ is stored as $\delta_0$.

16. A method for evaluating a first periodic function on a computer utilizing a special number comprising:

providing argument reduction of an original argument such that a floating-point representation of π/2 having a reduced number of bits is stored within said computer comprising:

selecting a special number $P_j$ based upon a bit length of a register of said computer;

processing said original argument by subtracting from said original argument a first non-negative integer multiple of said special number $P_j$ to obtain a first reduced argument; and processing said first reduced argument by subtracting from said first reduced argument a second non-negative integer multiple of said floating-point representation of π/2 to obtain a second reduced argument;

processing a third argument, equal to a sum of said second reduced argument plus a product of said first non-negative integer multiple and a floating-point representation of a second number $\delta_j$, said second number $\delta_j$ being shifted off a selected number of bit positions from said special number $P_j$, by evaluating a second periodic function at said third argument; and outputting a value of said first periodic function evaluated at said original argument utilizing said second periodic function evaluated at said third argument.

17. The method of claim 18, wherein said processing said original argument further includes processing to generate a value of said first reduced argument that is less than $P_j$ in magnitude.

18. The method of claim 17, wherein said processing said first reduced argument further includes processing to generate a value of said second reduced argument that is not greater than a second floating-point representation of π/4 in magnitude.

19. The method of claim 15, wherein said outputting further includes outputting a value of said first periodic function that is precise to a precision of said computer.

20. The method of claim 15, wherein said processing said original argument includes the use of $P_j$ having a mantissa representation of 64 bits or less and said outputting includes outputting of a 64 bit mantissa floating-point number.

21. The method of claim 15, further wherein the floating-point representations of $\pi/2$ and $\delta_j$ have double and single precision, respectively.

22. The method of claim 15, wherein said processing said original argument further includes said special number $P_j$ to equal to a special number $P_0$, and wherein processing said third argument further includes said second number $\delta_j$ to equal to a number $\delta_0$.

23. A computer for providing argument reduction utilizing a special number to compute a first trigonometric function of an original argument comprising:

a memory to store a special number $P_j$;

a processor coupled to receive said special number $P_j$ and to provide argument reduction of said original argument such that a floating-point representation of $\pi/2$ having a reduced number of bits is stored within said memory wherein said special number $P_j$ is dependent upon a bit length of a register within an arithmetic logic unit of said processor;

said processor subtracting from said original argument a first non-negative integer multiple of said special number $P_j$ to obtain a first reduced argument;

said processor subtracting from said first reduced argument a second non-negative integer multiple of said floating-point representation of $\pi/2$ to obtain a second reduced argument;

said processor evaluating a second trigonometric function at a third argument equal to a sum of said second reduced argument plus a product of said first non-negative integer multiple and a floating-point representation of a second number $\delta_j$, said second number $\delta_j$ being paired with $P_j$ and being shifted off a selected number of bit positions from $P_j$; and said processor generating as an output a value utilizing said second trigonometric function evaluated at said third argument, said output being a computed result to determine the value of said first trigonometric function of said original argument.

24. The computer of claim 23, wherein said processor processes said first reduced argument to be less than the special number $P_j$ in magnitude.

25. The computer of claim 26, wherein said processor processes said second reduced argument to be not greater than a second floating-point representation of $\pi/4$ in magnitude.

26. The computer of claim 27, wherein said processor processes the floating-point representations of $\pi/2$ and $\delta_j$ in double and single precision number formats, respectively.

27. The computer claim 27, wherein said processor processes said first trigonometric function selected from a sine or cosine function, and said first trigonometric function is $-^K$ multiple of said second trigonometric function, said integer K being a sum of said second non-negative integer multiple plus a product of said first non-negative integer multiple and M, and wherein said integer M is defined by the equation $P_j=2\pi M+\delta_j$.

28. The computer of claim 23, wherein said memory is a register and said arithmetic logic unit processes floating-point numbers having 64 bit mantissas and said special number $P_j$ has a mantissa of not more than 64 bits.

* * * * *

UNITED STATES PATENT AND TRADEMARK OFFICE
CERTIFICATE OF CORRECTION

PATENT NO.     : 6,141,670
DATED          : October 31, 2000
INVENTOR(S)    : Story et al.

It is certified that error appears in the above-identified patent and that said Letters Patent is hereby corrected as shown below:

Column 6,
Line 59, delete "error," and insert -- error $_\Pi$ --.
Line 59, delete "errors" and insert -- error $_\delta$ --.

Column 10,
Lines 5, 26 and 29, delete "claim 9" and insert -- claim 8 --.
Line 8, delete "claim 10" and insert -- claim 9 --.
Lines 12, 15 and 18, delete "claim 11" and insert -- claim 10 --.
Line 59, delete "claim 18" and insert -- claim 16 --.

Column 11,
Lines 1, 4, 8 and 11, delete "claim 15" and insert -- claim 18 --.

Column 12,
Line 15, delete "claim 26" and insert -- claim 24 --.
Lines 19 and 22, delete "claim 27" and insert -- claim 25 --.

Signed and Sealed this

Fifth Day of August, 2003

JAMES E. ROGAN
*Director of the United States Patent and Trademark Office*